P. R. SIMMONS.
DISH.
APPLICATION FILED NOV. 7, 1919.

1,356,409.

Patented Oct. 19, 1920.

WITNESSES

INVENTOR
PAUL R. SIMMONS
BY
ATTORNEYS

UNITED STATES PATENT OFFICE.

PAUL RAYMOND SIMMONS, OF HUNTINGTON, INDIANA.

DISH.

1,356,409.  Specification of Letters Patent.  Patented Oct. 19, 1920.

Application filed November 7, 1919. Serial No. 336,464.

*To all whom it may concern:*

Be it known that I, PAUL RAYMOND SIMMONS, a citizen of the United States, and a resident of Huntington, in the county of Huntington and State of Indiana, have invented a new and Improved Dish, of which the following is a full, clear, and exact description.

This invention relates to dishes for use in the serving of ice cream and other comestibles, and has reference more particularly to a utensil of this kind which comprises a permanent holder and a removable and replaceable container fitted into the holder.

An object of the invention is to provide a simple and inexpensive dish for the purpose specified, which can be cheaply produced in large quantities, which can be fashioned from different, suitable materials, and which is particularly useful in restaurants, drug stores and similar establishments.

A further object of the invention is to provide a utensil of the class described in which the container is securely held against displacement when the dish is in use, which permits the easy and expeditious removal and replacement of the container, and which is of artistic and ornamental nature.

A still further object of the invention is to provide a dish of the kind described, in which the holder is particularly adapted to receive and hold containers of fluted form.

The invention consists in the construction and combination of parts to be more fully described hereinafter and more particularly set forth in the claims.

Reference is to be had to the accompanying drawings forming a part of this specification, in which similar characters of reference indicate corresponding parts in all the views, and in which—

Before proceeding to a more detailed explanation of my invention, it should be clearly understood that the same may be fashioned from any suitable material, but I prefer to make the holder of metal which can be nickel-plated or otherwise desirably finished. The containers are preferably of paraffined paper or the like and are intended for individual use only. In this way a thoroughly sanitary dish is provided for use in drug stores and the like. If so desired, the dish may be constructed in larger sizes for domestic table use or for other purposes. Certain of the details of construction forming part of this invention may be varied in accordance with necessity or preference, without departing from the spirit of the invention.

Figure 1:
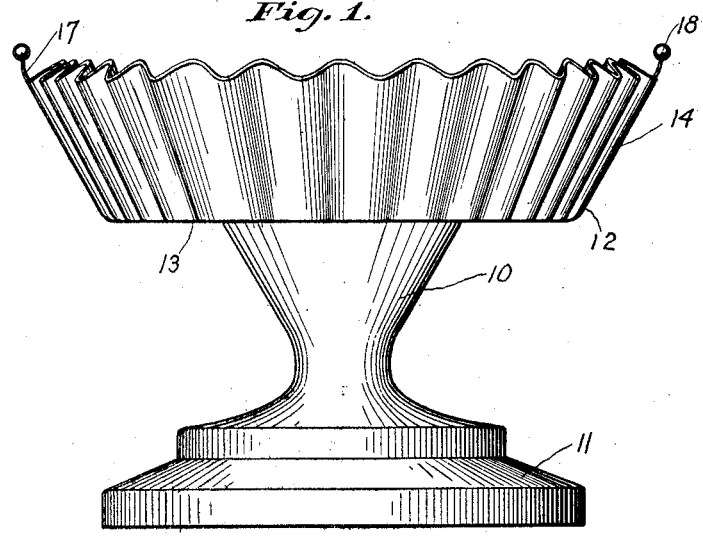
Figure 1 is a side elevation of an embodiment of my invention, showing the container removed.
Figure 2:
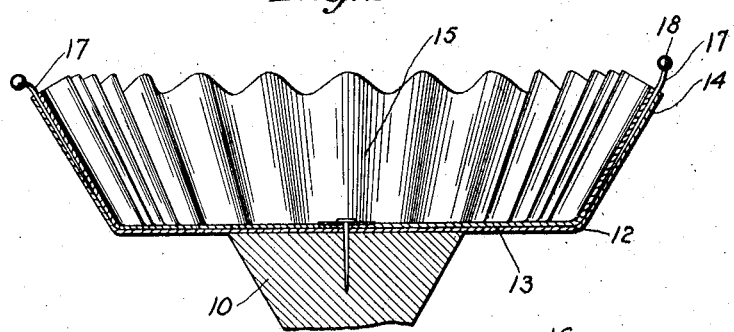
Fig. 2 is a transverse cross-section showing part of the base or standard broken away.
Figure 3:
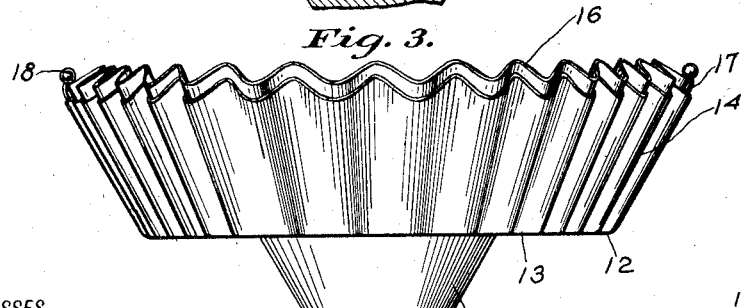
Fig. 3 is a side elevation of the upper part of the holder, showing a container in position.

Referring more particularly to the drawings, the holder of the dish has a support or standard 10 provided with a suitable base 11 of circular form. The support may be suitably ornamented in any manner. Mounted upon the support is the holder proper, 12, consisting, preferably of two thicknesses of sheet metal as shown in Fig. 2. The holder has a substantially flat, circular bottom 13, and outwardly flaring, upwardly disposed, fluted sides 14. The holder is secured upon the support in any suitable manner, for example, by means of a nail or pin 15, driven through the bottom of the holder into the top of the support.

The container 16 is proportioned to fit snugly into the holder and is of similar shape and has like, fluted sides. Preferably, the container projects a short distance above the upper edge of the holder, to facilitate the removal thereof. It will be readily understood that the fluted sides of the holder and the container interlock and any turning movement of the container when the dish is in use is thus obviated. Suitable fastening devices to hold the container in place are provided. These may be of any form adapted for the purpose. I have shown, for example, herewith, fastening devices at opposite sides of the holder, each consisting of a pin 17 inserted between the two thicknesses of the holder sides. The pin has a round head 18, slightly bent to one side. The heads of the pins may be disposed over the edge of the container, or turned to the outside to permit its removal.

Having thus described by invention, I claim as new, and desire to secure by Letters Patent:—

1. A dish comprising a holder adapted to receive a container, and spaced retaining members mounted to turn on the holder, said members projecting above the holder and adapted to extend over the container to hold it in position or to be turned aside to permit the removal of the container.

2. A dish comprising a holder adapted to receive a container fitting into said holder, and a member mounted to turn on the holder and extending above the side of said holder, said member having a head adapted to project over said container to hold the same in position, or to be turned aside to permit removal of the container.

3. A dish comprising a holder having double walls and adapted to receive a container fitting into said holder, and a member positioned between the two thicknesses of the walls of said holder, and having a head adapted to project over said container, to hold the same in position.

4. A dish, comprising in combination, a base, a holder mounted upon said base and having outwardly and upwardly disposed, fluted sides of double thickness, said holder being adapted to receive a correspondingly formed container fitted into said holder, and a member positioned between the two thicknesses of the sides of said holder, and having a head adapted to project over said container, to hold the same in position.

5. A dish comprising a holder having sides of double thickness and provided with means for engaging a container, adapted to fit into said holder, to prevent turning movement of said container, and a member positioned between the two thicknesses of the sides of said holder, and having a head adapted to project over said container, to hold the same in position.

PAUL RAYMOND SIMMONS.